(12) United States Patent
Watfa et al.

(10) Patent No.: US 11,751,276 B2
(45) Date of Patent: *Sep. 5, 2023

(54) METHODS FOR PROTOCOL ENHANCEMENTS IN 5G NAS

(71) Applicant: InterDigital Patent Holdings, Inc., Wilmington, DE (US)

(72) Inventors: Mahmoud Watfa, Saint Leonard (CA); Behrouz Aghili, Commack, NY (US); Saad Ahmad, Montreal (CA); Xiaoyan Shi, Westmount (CA); Ulises Olvera-Hernandez, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,521

(22) Filed: Jul. 12, 2022

(65) Prior Publication Data
US 2022/0346178 A1 Oct. 27, 2022

Related U.S. Application Data

(63) Continuation of application No. 16/961,047, filed as application No. PCT/US2019/012705 on Jan. 8, 2019, now Pat. No. 11,438,953.
(Continued)

(51) Int. Cl.
*H04W 4/00* (2018.01)
*H04W 76/25* (2018.01)
(Continued)

(52) U.S. Cl.
CPC ............. *H04W 76/25* (2018.02); *H04W 8/08* (2013.01); *H04W 48/16* (2013.01);
(Continued)

(58) Field of Classification Search
CPC ..... H04W 76/19; H04W 76/25; H04W 76/30; H04W 8/08; H04W 48/16; H04W 60/005
(Continued)

(56) References Cited

U.S. PATENT DOCUMENTS

| 10,750,473 B2 | 8/2020 | Ke et al. |
| 2012/0236709 A1 | 9/2012 | Ramachandran et al. |

(Continued)

FOREIGN PATENT DOCUMENTS

| CN | 107018542 A | 8/2017 |
| CN | 107371215 A | 11/2017 |

(Continued)

OTHER PUBLICATIONS

CN 107018542 A, English Abstract and English Translation previously submitted with Information Disclosure Statement dated Feb. 25, 2022, in related U.S. Appl. No. 16/961,047.
(Continued)

*Primary Examiner* — Temica M Beamer
(74) *Attorney, Agent, or Firm* — Flaster Greenberg, P.C.

(57) ABSTRACT

Methods, systems, and apparatuses for protocol data unit (PDU) session management over different access technologies (ATS) are disclosed. A wireless transmit/receive unit (WTRU) may receive a first message from a network over a first access technology. The first message may include an indication for the WTRU to reestablish resources for one or more protocol data unit (PDU) sessions over a second access technology. The WTRU may determine that a PDU session of the one or more PDU sessions is locally deactivated by the WTRU. The WTRU may send a second message via the first access technology. The second message may include a PDU session status information element (IE) indicating the PDU session is locally deactivated such that the network releases the PDU session.

20 Claims, 9 Drawing Sheets

Related U.S. Application Data

(60) Provisional application No. 62/716,516, filed on Aug. 9, 2018, provisional application No. 62/653,817, filed on Apr. 6, 2018, provisional application No. 62/616,687, filed on Jan. 12, 2018.

(51) Int. Cl.
| | |
|---|---|
| *H04W 76/19* | (2018.01) |
| *H04W 76/30* | (2018.01) |
| *H04W 8/08* | (2009.01) |
| *H04W 48/16* | (2009.01) |
| *H04W 60/00* | (2009.01) |

(52) U.S. Cl.
CPC ......... *H04W 60/005* (2013.01); *H04W 76/19* (2018.02); *H04W 76/30* (2018.02)

(58) Field of Classification Search
USPC .......................................................... 370/329
See application file for complete search history.

(56) References Cited

U.S. PATENT DOCUMENTS

| | | | |
|---|---|---|---|
| 2015/0085824 | A1 | 3/2015 | Gotou et al. |
| 2015/0264615 | A1 | 9/2015 | Zhao et al. |
| 2016/0338138 | A1 | 11/2016 | Pelletier et al. |
| 2017/0048781 | A1 | 2/2017 | Jung et al. |
| 2018/0376445 | A1 | 12/2018 | Yoon et al. |
| 2019/0021064 | A1 | 1/2019 | Ryu et al. |
| 2019/0037636 | A1 | 1/2019 | Kim et al. |
| 2020/0178196 | A1 | 6/2020 | Wang et al. |
| 2020/0196379 | A1 | 6/2020 | Park et al. |

FOREIGN PATENT DOCUMENTS

| | | |
|---|---|---|
| JP | 2014512742 A | 5/2014 |
| WO | WO 2017142362 A1 | 8/2017 |
| WO | WO 2018/006017 A1 | 1/2018 |
| WO | WO 2018/008944 A1 | 1/2018 |

OTHER PUBLICATIONS

WO 2017142362 A1, US 2019/0037636 A 1.
JP 2014512742 A, US 2012/0236709 A 1.
CN 107371215 A, U.S. Pat. No. 10,750,473 B2.
WO 2018008944 A1, US 2019/0021064 A1.
3rd Generation Partnership Project (3GPP); C1-174875; "Technical Specification Group Core Network and Terminals"; Huawei, HiSilicon; 5G System—Phase 1; CT WG1 Aspects; Release 15; Sophia Antipolis, France, Nov. 2017; 225 Pages.
3rd Generation Partnership Project (3GPP); C1-183147; "Correction of terminology PDU deactivation"; Huawei, HiSilicon; 3GPP TSG-CT WG1 Meeting #111; Osaka (Japan), May 20-25, 2018; 4 Pages.
Ericsson, "POU session status in notification response message," 3GPP TSG-CT WG1 Meeting #112, C1-185807, West Palm Beach, FL (USA) (Aug. 20-24, 2018).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital et al., "Clarifications for the Notification Response message," 3GPP TSG-CT WG1 Meeting #108, C1-181682, Gothenburg (Sweden) (Jan. 22-26, 2018).
Third Generation Partnership Project, "Technical Specification Group Services and System Aspects; System Architecture for the 5G System; Stage 2 (Release 15)," 3GPP TS 23.501 V1.0.0 (Jun. 2017).
Third Generation Partnership Project, "Technical Specification Group Services and System Aspects; System Architecture for the 5G System; Stage 2 (Release 15)," 3GPP TS 23.501 V15.0.0 (Dec. 2017).
Third Generation Partnership Project, "Technical Specification Group Services and System Aspects; System Architecture for the 5G System; Stage 2 (Release 15)," 3GPP TS 23.501 V15.4.0 (Dec. 2018).
Third Generation Partnership Project, "Technical Specification Group Core Network and Terminals; Non-Access-Stratum (NAS) protocol for 5G System (5GS); Stage 3 (Release 15)," 3GPP TS 24.501 V0.2.2 (Dec. 2017).
Third Generation Partnership Project, "Technical Specification Group Services and System Aspects; Telecommunication management; Charging management; Study on charging aspects of 5G system architecture Phase 1 (Release 15)," 3GPP TR 32.899 V0.2.0 (May 2017).
Third Generation Partnership Project, "Technical Specification Group Core Network and Terminals; Mobile radio interface signalling layer 3; General aspects (Release 15)," 3GPP TS 24.007 V15.3.0 (Dec. 2018).
Third Generation Partnership Project, "Technical Specification Group Core Network and Terminals; Mobile radio interface signalling layer 3; General aspects (Release 14)," 3GPP TS 24.007 V14.0.0 (Mar. 2017).
Third Generation Partnership Project, "Technical Specification Group Core Network and Terminals; Non-Access-Stratum (NAS) protocol for 5G System (5GS); Stage 3 (Release 15)," 3GPP TS 24.501 V15.2.1 (Jan. 2019).
Third Generation Partnership Project, "Technical Specification Group Core Network and Terminals; Non-Access-Stratum (NAS) protocol for 5G System (5GS); Stage 3 (Release 15)," 3GPP TS 24.501 V15.0.0 (Jun. 2018).
Third Generation Partnership Project, "Technical Specification Group Services and System Aspects; Telecommunication management; Charging management; Study on charging aspects of 5G system architecture phase 1 (Release 15)," 3GPP TR 32.899 V15.0.0 (Jan. 2018).
Third Generation Partnership Project, "Technical Specification Group Services and System Aspects; Telecommunication management; Charging management; Study on charging aspects of 5G system architecture phase 1 (Release 15)," 3GPP TR 32.899 V15.1.0 (Mar. 2018).

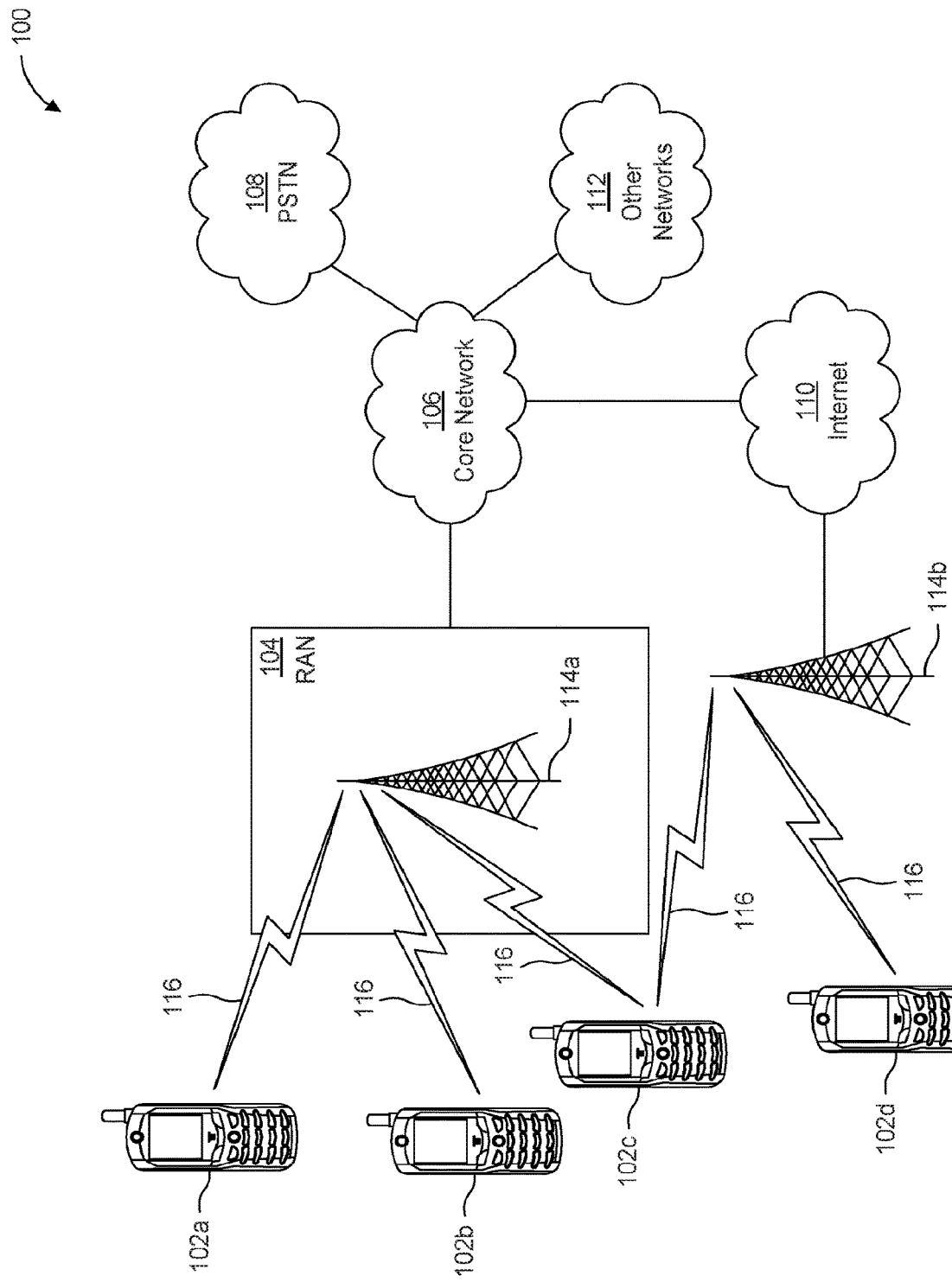

METHODS FOR PROTOCOL ENHANCEMENTS IN 5G NAS

CROSS REFERENCE TO RELATED APPLICATIONS

This application is a continuation of U.S. Non-Provisional application Ser. No. 16/961,047, filed Jul. 9, 2020, which is the U.S. National Stage, under 35 U.S.C. § 371, of International Application No. PCT/US2019/012705, filed Jan. 8, 2019, which claims the benefit of U.S. Provisional Application No. 62/616,687 filed Jan. 12, 2018, U.S. Provisional Application No. 62/653,817 filed Apr. 6, 2018, and U.S. Provisional Application No. 62/716,516 filed on Aug. 9, 2018, the contents of which are hereby incorporated by reference herein.

BACKGROUND

Fifth Generation (5G) mobile networks may allow a wireless transmit/receive unit (WTRU) to be registered to the same Access and Mobility Function (AMF) over both a Third Generation Partnership Project (3GPP) access technology and a non-3GPP access technology (e.g., WiFi) within the same public land mobile network (PLMN).

SUMMARY

A method for protocol data unit (PDU) session management over different access technologies (ATs) is disclosed. A wireless transmit/receive unit (WTRU) may receive a first message from a network over a first access technology. The first message may trigger an activation or reactivation of one or more PDU sessions over a second access technology. The WTRU may determine that one or more PDU sessions have locally been deactivated by the WTRU. The WTRU may determine that it is in a limited service state associated with the second access technology. The WTRU may send a second message via the first access technology. The second message may include a PDU session status information element (IE) indicating that one or more PDU sessions are locally deactivated such that the network releases the PDU session.

A WTRU is disclosed. The WTRU may include an antenna and a processor operatively coupled to the antenna. The processor and the antenna may be configured to receive a first message from a network over a first access technology. The first message may trigger an activation or reactivation of one or more PDU sessions over a second access technology. The processor may be configured to determine that one or more PDU sessions are locally deactivated. The processor may be further configured to determine that the WTRU is in a limited service state over the second access technology. The processor and the antenna may be further configured to send a second message over the first access technology. The second message may include a PDU session status information element (IE) indicating that one or more PDU sessions are locally deactivated such that the network releases the PDU session.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1A is a system diagram illustrating an example communications system in which one or more disclosed embodiments may be implemented;

DETAILED DESCRIPTION

Figure 1B:
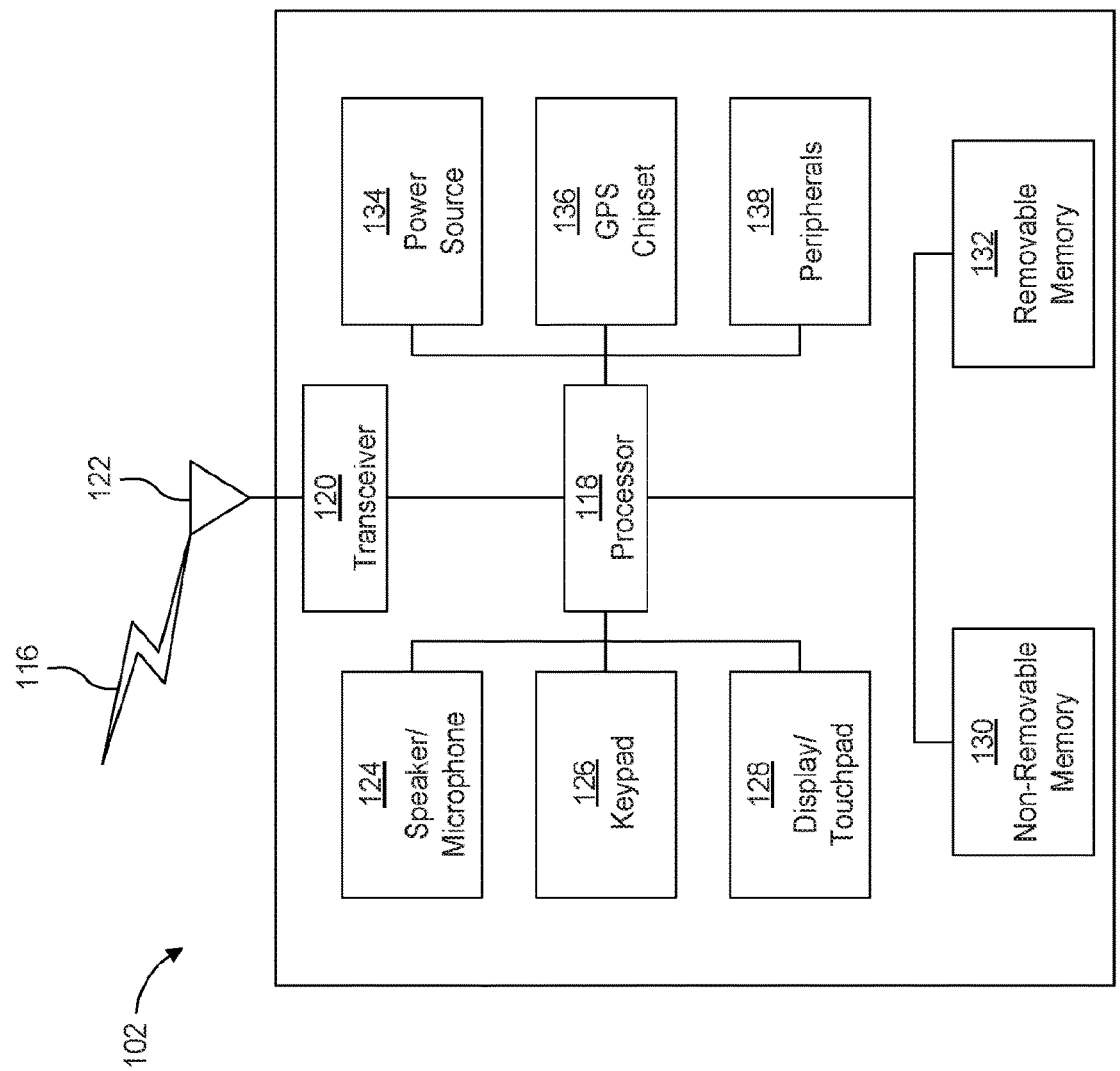
FIG. 1B is a system diagram illustrating an example wireless transmit/receive unit (WTRU) that may be used within the communications system illustrated in FIG. 1A according to an embodiment.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a halfduplex radio for which transmission and reception of some or all of the signals (e.g., associated with particular subframes for either the UL (e.g., for transmission) or the downlink (e.g., for reception)).

Figure 1C:
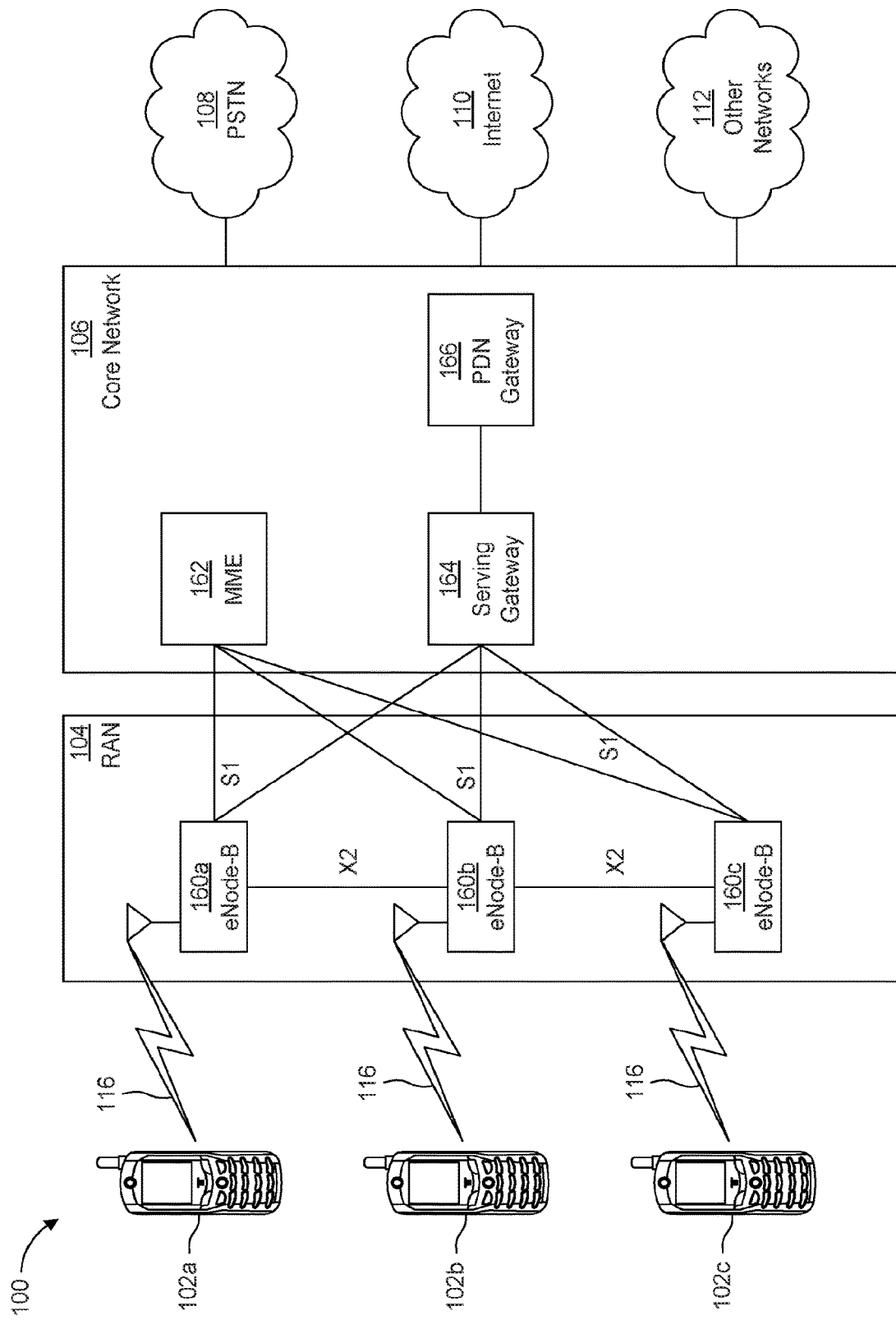
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
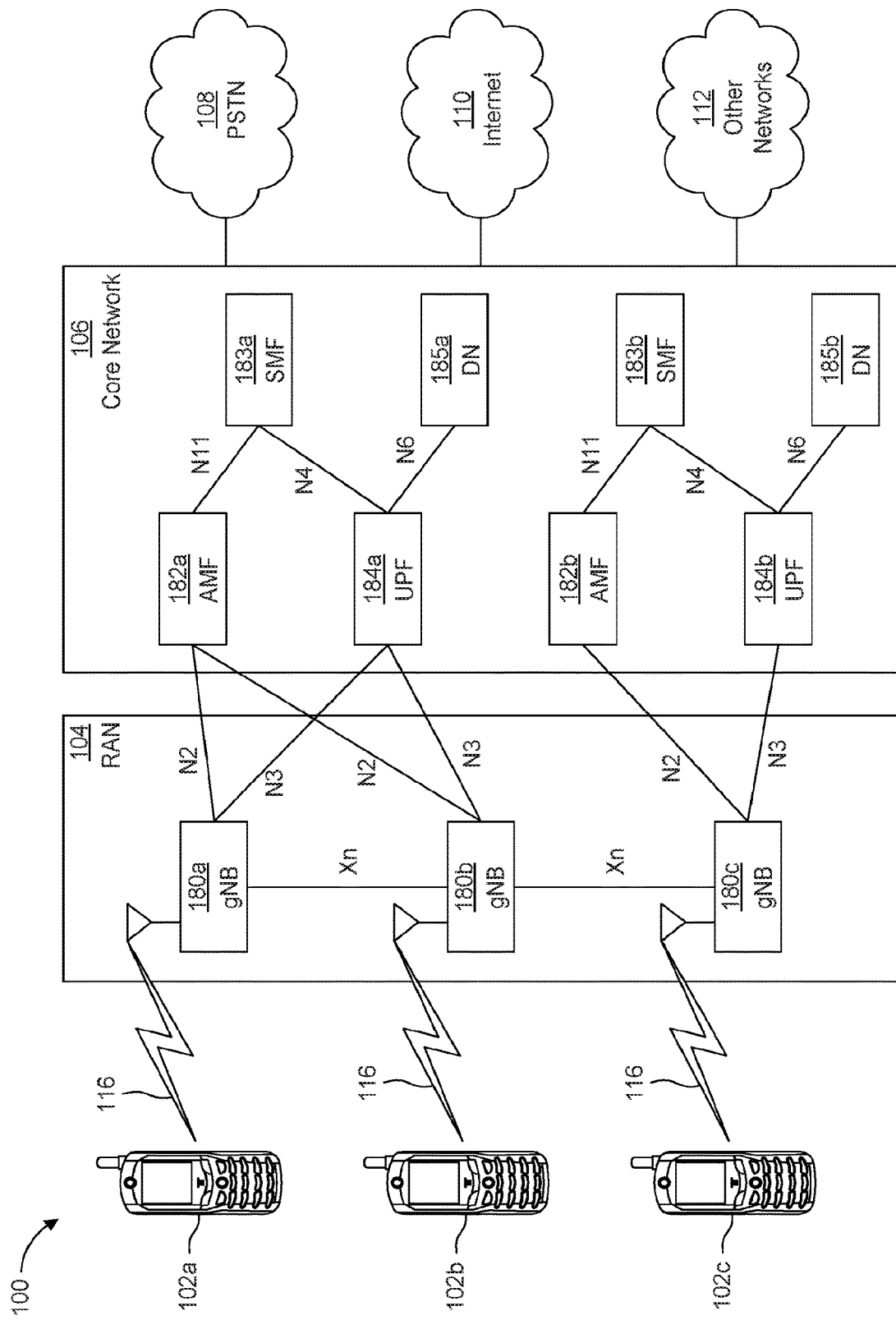
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As mentioned above, a WTRU may be registered to the same AMF over both a Third Generation Partnership Project (3GPP) access technology (AT) and a non-3GPP AT (e.g., WiFi) within the same public land mobile network (PLMN). After the WTRU is registered via these access technologies, the WTRU may be in one or more of the following modes. The WTRU may be in a 5GMM connected mode (CM) over both the 3GPP AT and the non-3GPP AT. The WTRU may be in CM over the 3GPP AT and in 5GMM idle mode (IM). The WTRU may be in IM over the 3GPP AT and CM over the non-3GPP AT. The WTRU may be in IM over both the 3GPP AT and the non-3GPP AT.

A paging procedure may be used to trigger the WTRU to transition from IM to CM via a Service Request procedure. However, paging may only occur via the 3GPP radio access network (RAN). Therefore, it may not be possible for a WTRU in IM over the non-3GPP AT to be paged. However, the WTRU may be in CM over one AT but not the other. For example, when the WTRU is in CM over the 3GPP AT and in IM over the non-3GPP AT, the network may need to inform the WTRU that there is downlink (DL) data associated with PDU sessions that have been previously established over the non-3GPP AT. To do so, the network may use a notification procedure to inform the WTRU. The network may send the WTRU a notification message. The notification message may include an indication for the WTRU to reestablish resources for one or more protocol data unit (PDU) sessions over a second access technology. The indication may be either implicit or explicit.

In an example, the WTRU may receive the notification message over the non-3GPP AT. However, because the WTRU may be in IM over the non-3GPP AT, the WTRU may respond to the notification message over the 3GPP AT and inform the network that it desires to receive the data over the 3GPP AT although the PDU sessions in question are associated with the non-3GPP AT.

A service request message may be sent in CM over the 3GPP AT to inform the network to set up resources for the PDU sessions that the WTRU has moved over to the 3GPP AT. The WTRU may tell the network which PDU sessions are allowed to be moved by including an information element (IE) known as the Allowed PDU session status. If the WTRU does not want to move any of its PDU sessions over the 3GPP AT, or has locally deactivated one or more PDU sessions that existed on the 3GPP AT, the WTRU may respond with a notification response indicating that no user plane resources should be activated for these PDUs over the 3GPP AT.

An AMF may not be able to serve more than one Network Slice Selection Assistance Information (NSSAI). For example, a first NSSAI may correspond to an isolated network slice. If a WTRU is connected to a network slice with a value of the first NSSAI, the WTRU may not be able to connect to another network slice at the same time.

In an example, the notification message may also include a PDU session identification (ID) corresponding to the PDU session for which there is DL data for the WTRU. The WTRU may accept the transfer of the PDU to another access based on WTRU policy.

Furthermore, although the PDU session for which the network is sending a notification message may be desired to be transferred to the 3GPP AT, the WTRU may also want to transfer other PDU sessions although pending DL data exits at the moment.

The notification message may be used for data related to existing PDU sessions only. However, this may limit the efficiency of the message. For example, there may be other cases for which the notification can be used to reduce paging on the radio network of the 3GPP system and trigger a service request from the WTRU. Thus, conventional uses of the notification may be very limited. IT may be desirable to expand the uses of the notification message to cover new cases or to apply to services that are not related to existing PDU sessions.

In cases when the WTRU is in CM over the non-3GPP AT but in IM over the 3GPP AT, the WTRU may have data or signaling to perform over the 3GPP AT (e.g., to perform a periodic registration update). At the same time, the WTRU's NAS entity may receive a notification message from the AMF over the non-3GPP AT. The WTRU behavior in this case is not clear. The WTRU may not have a set procedure to prioritize signaling and may not know what to set as the establishment cause in the RRC layer.

Also, in cases when the WTRU is in CM over the non-3GPP AT but in IM over the 3GPP AT, the network may have previously experienced some overload or congestion for data traffic related to a gateway (e.g., PGW or UPF) or related to an Access Point Name (APN) or Data Network Name (DNN). The WTRU may receive a back-off timer at the session management level.

The reception of the back-off timer may prohibit the WTRU from sending signaling related to that specific node/network. There may be means for the network to inform the WTRU that the congestion has been lifted at the network side, hence allowing the WTRU to start sending signaling/data traffic toward that network. For this to be realized, the WTRU may need to be in CM. However, since the WTRU may be in IM over the 3GPP AT and in CM over the non-3GPP AT, there may be a way to take advantage of this arrangement and inform the WTRU that the congestion has been alleviated.

In both the WTRU and the network, there may be several protocol entities at the NAS level. When a protocol entity in the WTRU/network needs to send a message to another "corresponding" protocol entity in the WTRU/network, the sender may use a specific (e.g., pre-defined) value in a special field in the header of the NAS message called a Protocol Discriminator (PD). At the receiving side, the receiver may look at the PD value in order to understand what protocol entity is addressed. The PD field may indicate several protocol entities added with the evolution of GPRS, UMTS and EPS. There may not be a value left to be assigned to new 5G protocol entities. A new NAS Header may be used for 5G protocols and an extended version of the PD, referred to as Extended Protocol Discriminator (EPD), may be incorporated. It may be desirable to further define the EPD.

A 5G system may have a defined procedure to update the WTRU with new parameters related to several needs, such as, for example, changing the WTRU's identity (5G GUTI) and/or Tracking Area Identity (TAI) list, providing a new service area list, and providing allowed NSSAI. However, there may be some ambiguity with the use of a WTRU configuration update message. The AMF may update WTRU configuration by providing new parameter information with a command or may request the WTRU to perform a new registration update with the network to update parameters. The procedure may be initiated by the network and may be used when the WTRU has an established 5GMM context and is in 5GMM-CM. The AMF may require a confirmation response in order to ensure that the parameter has been updated by the WTRU.

The following parameters may be supported by the generic WTRU configuration update procedure without the need for triggering a WTRU registration update procedure: 5G-GUTI, TAI list, service area list, allowed NSSAI, network identity and time zone information (e.g., full name for network, short name for network, local time zone, universal time and local time zone, network daylight saving time), and local area data network (LADN) information. One or more configuration parameters (e.g., policy information) may be updated by this procedure. Configuration provided by a different NF than the AMF may be covered by this procedure or may be provided by a different NAS procedure, for example, WTRU route selection policies (RSP) provided by a PCF.

A Mobile Initiated Connection Only (MICO) parameter may require the triggering of the WTRU registration update procedure. The MICO mode of operation may be used for power saving at the WTRU. When the WTRU employs MICO, it may deactivate its radio access capability and transition to a sleep mode. The sleep mode may be extended and the WTRU may "disappear" from the network. If a WTRU is configured to operate in MICO, a mechanism for the WTRU and the CN (e.g., the AMF) to inform one another about the usage of this mode of operation may be desirable. The WTRU may inform the CN (e.g., AMF) of this capability during the registration procedure. For example, the WTRU may send a parameter or IE in the registration request message informing the CN that it wants to apply the MICO mode.

This procedure may be implemented in one or more of the following examples. A new IE may be introduced to reflect either the capability to use a feature, such as, but not limited to MICO, that may require the network to accept its usage. The new IE may be a requested feature use IE. This IE may be one octet and each bit position may reflect the request by the WTRU to use a particular feature. For example, bit position 0 may be the least significant bit and bit position 8 may be the most significant bit. Bit position 0 may correspond to the MICO feature. Thus, when the WTRU wants to use the MICO feature, it may set the bits of this IE as "xxxxxxx1." Thus, a value of 1 may represent a request to use the feature and a value of 0 may represent an indication that the WTRU does not need to use the feature.

Extending this IE to apply to additional features, the most significant bit of this octet may be reserved to indicate if the IE is extended. For example, if bit position 8 has a value of 1, there may be an additional octet following this IE for extending it. The interpretation of the following octet may be defined as needed for additional features. For example, if the WTRU wants to reflect the use of seven features, it may set the bit position 8 to a value of 0. If the WTRU has more than seven features to reflect, it may set the bit position 8 to a value of 1 and use an additional octet. The bit position 8 of the additional octet may be reserved for the same purpose of indicating additional features. If the AMF accepts or allows the use of the feature, it may return a value of 1 for the bit position associated with the feature. Otherwise it may set the bit position to 0. It should be noted that the particular bit positions used above are provided as examples. Other bit positions may be defined or reserved to reflect any of the above.

Another way for the WTRU to indicate the use of MICO may be to use a bit position in the registration type IE. For example, the registration type IE in the registration request message may be one octet long. It may be a type value (TV) IE. The type may reflect that this is an IE for registration type and the value indicates the particular type of registration such as an initial registration or registration update. The value field may be four bits long and three bits may be used to reflect the registration type. The fourth bit may be reserved for MICO use. For example, bits 1001 may be interpreted as follows. The first least significant bits (001) may be defined to reflect a registration type "initial registration." The WTRU may set the MICO bit (e.g., the fourth and most significant bit of the half octet) to a value of 1 to indicate the need to use MICO.

The AMF may use a similar procedure to reflect the result of the registration. A registration result may also be defined with four bits. The least significant bits may reflect the type of registration that has been accepted by the AMF and the fourth bit may indicate to the WTRU whether the MICO has been allowed for use or not. When the WTRU receives a registration result, it may verify the fourth bit position to determine if MICO has been allowed. If the fourth bit position has a value of 1, then the WTRU may consider MICO to have been allowed and may start using the operation. If the fourth bit position has a value of 0, the WTRU may consider the use of MICO to be not allowed.

The MICO mode of operation may be terminated by the WTRU by transitioning from IM to CM in conjunction with a registration procedure or a service request procedure. If the network is congested, the CN may reject the request and provide the WTRU with a back-off timer. The WTRU may directly apply MICO (i.e., deactivate its radio capability), run the back-off timer, and then initiate a new procedure when the back-off timer expires.

The WTRU configuration update message may be sent to the WTRU if the WTRU is in CM. There may be no dependency on the AT over which the message may be sent. Upon receiving the WTRU configuration update message, the expected action by the WTRU may be re-registration. The WTRU may need to re-register to the network. However, some parameters and features such as MICO are only applicable to the 3GPP AT. A parameter that is applicable to the 3GPP AT may not be negotiated over the non-3GPP AT. Upon reception of the WTRU configuration update message with a registration required indication, the WTRU may perform a registration update after transitioning to idle mode. However, the AT that should be used to perform the registration update may not be specified.

Other parameters may apply to both AT equally, such as a 5G GUTI and an associated TAI list. Receiving a new NSSAI with registration required may affect both ATs since the allowed NSSAI may be associated with a TAI list and the different ATs may have different TAI lists. A WTRU may not know which AT to perform the registration update. The WTRU may not have the full information regarding the actions that should be performed. If the WTRU receives a new TAI list, it may not know which AT the TAI list may be associated with. It may be desirable to avoid ambiguity at the WTRU.

New network and WTRU behavior for using the NAS notification message may be described herein. This may include different interpretations at the WTRU and responses from the WTRU in different cases and scenarios. In addition, the following description may include an extension of the notification message to optimize system signaling and not be limited to session management signaling. New WTRU behavior for handling conflict conditions between simultaneous NAS procedures over the 3GPP AT and the non-3GPP AT may be described below. In addition, methods by which the AMF may inform the WTRU that at least session management congestion is terminated using a notification message may be described. The WTRU may use this information to stop session management back-off timers. In addition, the following description may include a new definition for the EPD in order to support other types of mobility management message types. New procedures for interpretation of the new EPD at the WTRU and network may also be defined.

In addition, the following description may include methods and procedures for minimizing ambiguity with the use of the WTRU configuration update message. The AMF may indicate the AT type for the parameters included in the WTRU configuration update message. The WTRU may update the parameters of the indicated ATs with the new values. For a new NSSAI received over the non-3GPP AT, the WTRU may start with a registration over the 3GPP AT if no AT information is provided in the WTRU configuration update message.

The NAS notification procedure may be optimized through WTRU and network behavior. It should be noted that the following description assumes the WTRU is in CM over the 3GPP AT and in IM over the non-3GPP AT. However, the examples provided may apply to any of the other connection scenarios described above.

The WTRU may receive, over the 3GPP AT, a notification message from the network. The AMF may send a notification message to the WTRU over the non-3GPP AT. The notification message may include an indication for the WTRU to reestablish resources for one or more protocol data unit (PDU) sessions. The indication may be either implicit or explicit.

In an example, the resources may be reestablished over a second access technology. This may be because there is DL data associated with one or more PDU sessions in 3GPP AT. The WTRU may have, for example, two PDUs that are associated with the non-3GPP AT, PDU X and PDU Y. Although the notification message may relate to the PDU sessions over 3GPP AT, the WTRU may also want to transfer all data for PDU Y to the 3GPP AT. Although no data is yet available for PDU Y, the WTRU may want to indicate this to the network ahead of time so that the network associates the other PDU with the 3GPP AT for subsequent DL data.

As such, the WTRU may still determine whether it wants other PDU IDs to be moved to the 3GPP AT. As described above, this decision may be based on local policies or the WTRU may display a message to a user who can change settings and set preferences. The WTRU may then send a service request and include a list of PDU IDs in the allowed PDU session status IE.

In an example, the notification message may also include one or more PDU session IDs associated with the non-3GPP AT for which the network can transfer the data towards the 3GPP AT. The WTRU may verify the received PDU session ID (PDU ID) against its local policies. The WTRU may have policies that indicate which PDU IDs are allowed to be transferred over a target access technology. The WTRU may verify if the received PDU ID is permitted to be transferred over a different target access technology. The WTRU may further verify details in its policies to make such a determination. Policy details may include, for example, time, location, and whether the PDU session is associated with a LADN. If any of the PDU IDs in the notification message are subject to transfer to another access, and the WTRU may determine to do so, the WTRU may send a service request message to the network. The service request message may include the list of PDU IDs that the WTRU desires to transfer to the 3GPP AT. The list of PDU IDs may be included in the allowed PDU session status IE. In other words, the WTRU may use the received PDU IDs to verify against its local policies and determine which PDU IDs may be transferred to the 3GPP AT.

The WTRU may have uplink data to send related to at least one PDU ID associated with the non-3GPP AT. However, the WTRU may not be in coverage of the non-3GPP AT or the WTRU may have policies to move the PDU sessions to the 3GPP AT. In this case, although the WTRU is not paged, the WTRU may send a service request and may include the allowed PDU session status IE to indicate to the network that it desires to transfer the indicated PDU sessions from the non-3GPP AT to the 3GPP AT.

The WTRU may include a NAS level establishment cause in the service request message to inform the AMF why the service request is being sent. The details of this NAS level establishment cause may be defined in additional details below. The WTRU may include a NAS level establishment cause or other type of information that explains why it is sending a service request message and/or a service type that the WTRU would like to request. For example, the WTRU may include a service type set to "transfer PDU from non-3GPP to 3GPP" to indicate that the WTRU desires to transfer at least one PDU session (e.g., identified by the allowed PDU session status IE) from the non-3GPP AT to the 3GPP AT.

The AMF may receive a service request message (or other NAS message) with the allowed PDU session status IE that identifies at least one PDU ID that the WTRU desires to transfer from the non-3GPP AT to the 3GPP AT. The WTRU may also include a NAS level establishment cause or other information, such as a service type that indicates "transfer PDU from non-3GPP to 3GPP" as described above. The AMF may verify the PDU ID and may determine that at least one PDU ID has no DL data pending. The AMF behavior may be different depending on whether the WTRU is initiating the service request by itself or if it is responding to paging or a notification message.

The AMF may determine if the WTRU is initiating the service request by itself (i.e., the message is not a response to paging or a notification message) by verifying that the establishment cause is received from the lower layers (i.e., the RAN). Alternatively, the AMF may determine this by verifying the NAS level establishment cause or the service type as described above. If the AMF may determine that the WTRU is initiating the service request by itself, the AMF may proceed with the procedure and inform the SMF to change the associated AT from non-3GPP to 3GPP. The SMF may receive a request, for example using the defined reference points (e.g., Nsmf_PDUSession_UpdateSMContext Request), to set up resources for a PDU session identified by a PDU ID. The request may also contain an AT type. If the AT type is not the same as the AT type in the WTRU's session management (SM) context, the SMF may update the AT type to reflect the received AT type from the AMF. The SMF may take other actions and inform other network nodes about the updated AT associated with the identified PDU session. For example, the SMF may inform the PCRF about this change using the appropriate reference point.

If the AMF may determine that the WTRU is initiating the request by itself and the AMF receives at least one PDU session for which the WTRU desires to transfer from the non-3GPP AT to the 3GPP AT, the AMF may proceed with the service request procedure so that user plane resources and connections are set up for the WTRU. If accepted by the AMF, the AMF may respond to the WTRU with a service accept message and indicate the PDU session IDs for which the AMF has accepted to setup user plane resources.

If the AMF pages the WTRU over the 3GPP AT for data related to non-3GPP AT PDU sessions, and the WTRU has included at least one PDU ID associated with the non-3GPP AT which it wants to move to the 3GPP AT, the AMF may take any of the following actions described herein.

The AMF may verify if the provided PDU ID is associated with DL pending data. If the PDU ID is associated with DL pending data, the AMF may set up the resources as described above. If the PDU ID is associated with DL pending data (i.e., if there is a PDU ID in the service request message for which there is no DL data), the AMF may take any of the following actions.

The AMF may reject the service request message. The AMF may send a service reject message to the WTRU, which may include a cause code to indicate to the WTRU that there is no pending DL data at the moment. The AMF may also indicate whether the PDU connection is now considered to be associated with the 3GPP AT or if it is still associated with the non-3GPP AT. The AMF may have preferences or policies to determine this. Alternatively, as discussed above, the WTRU may include a preference in the service request message, where, for each PDU ID, the WTRU may inform the network whether it wants to associate the PDU with a different AT. The WTRU may use its local policies to determine this. When the AMF determines that a PDU session referenced by a PDU ID may be associated with the 3GPP AT, the AMF may include the PDU ID and the associated AT. The WTRU may then update its local information to indicate that the PDU ID is associated with a different AT, whose type may be indicated in the NAS message (e.g., service reject message).

The AMF may accept the service request message and include a cause code to indicate that the resources are not set up intentionally (e.g., due to unavailability of pending DL data as described above). The AMF may also include additional information in the NAS message to inform the WTRU that the PDU sessions, identified by PDU IDs, have been considered to be transferred to, or are now associated with, another AT. The WTRU may receive a service reject message with a new cause code indicating that a list of PDU IDs have no resources set up for them. In addition, the message may indicate that the PDU session, referenced by a PDU ID, is not associated with another AT. The WTRU may update its local SM context to reflect the new AT that is now associated with each of the PDU session identified by the PDU ID.

The WTRU may receive a service accept message in response to sending a service request message indicating a list of PDU IDs for which the WTRU wants to transfer to or associate with a different AT. The WTRU may expect that resources will be set up due to the reception of the service accept message. However, if the resources are not set up (e.g., if the RRC layer in the WTRU did not receive a configuration message to setup radio resources), the WTRU may assume that there is a failure either locally or at the network.

To avoid the WTRU considering the procedure as unsuccessful, the WTRU may use the provided information in the service accept message to determine if the service request procedure is successful. The WTRU may use any of the IEs described above that may be included in the NAS message by the AMF. For example, the WTRU may use a cause code with a value that indicates that the network has intentionally not set up user plane resources as a means to determine that the service request procedure is successful although no user plane resources or radio resources for the user plane are set up.

Alternatively, the WTRU may use a cause code or additional information may indicate that a list of PDU sessions, referenced by PDU IDs, are now associated with another AT as a means to consider the successful completion of the service request procedure although no radio resources were setup. The WTRU may update its local context to reflect that the PDU sessions identified by PDU IDs are now associated with a different AT.

As described above, the proposals above can occur over any AT and any connection mode. It should be noted that the WTRU may send a service request message instead of a notification response message and may include any or all of the information described herein. The procedures for sending a notification response message by the WTRU may apply in a similar manner should the WTRU send a service request message instead.

Figure 2:
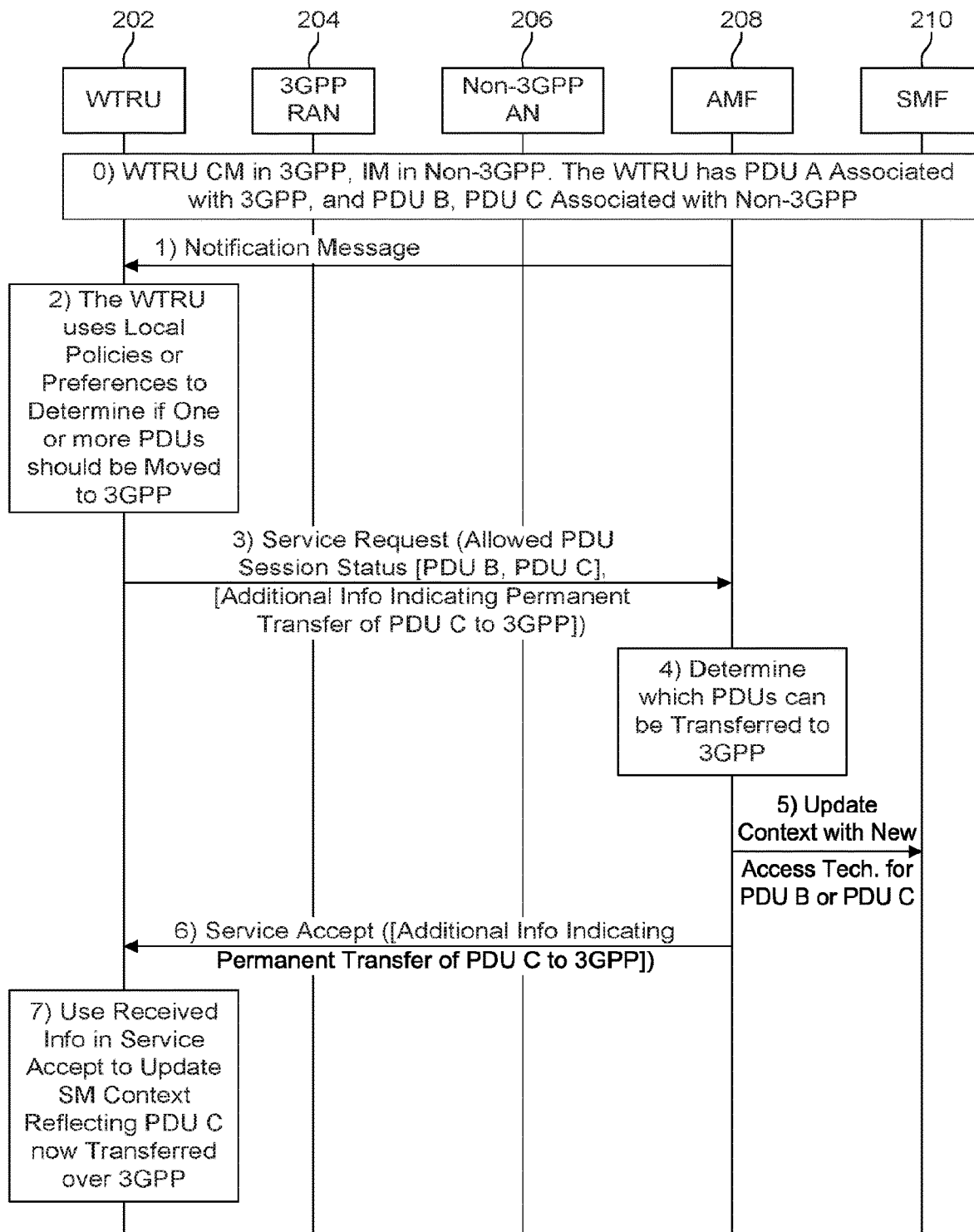
FIG. 2 is a flow diagram illustrating a procedure for protocol data unit (PDU) transfer over different access technologies (ATs)

Referring now to FIG. 2, a flow diagram illustrating a procedure for PDU transfer over different ATs is shown. FIG. 2 shows how some of the proposals described above may be used. The procedure for PDU transfer may include a WTRU 202, a 3GPP RAN 204, a non-3GPP 206 AN, an AMF 208, and an SMF 210.

As shown in step 0, the WTRU 202 may be in CM in the 3GPP AT and in IM in the non-3GPP AT. The WTRU 202 may have a PDU A associated with the 3GPP AT and may have a PDU B and PDU C associated with the non-3GPP AT.

In step 1, the WTRU 202 may receive a notification message from the AMF 208. The notification message may include an indication for the WTRU to reestablish resources for one or more protocol data unit (PDU) sessions. The indication may be either implicit or explicit. In an example, the resources may be reestablished over a second access technology. In step 2, the WTRU 202 may use local policies or preferences to determine if one or more PDUs should be moved over to the 3GPP AT.

In step 3, the WTRU 202 may send a service request message to the AMF 208. The service request message may include the allowed PDU session status (e.g., PDU B and/or PDU C). The service request message may also include additional information indicating permanent transfer of PDU C to the 3GPP AT.

In step 4, the AMF 208 may determine which PDUs can be transferred to the 3GPP AT.

In step 5, the AMF 208 may send an updated context to the SMF 210. The updated context may include access information for one or more of PDU B and PDU C.

In step 6, the AMF 208 may send a service accept message to the WTRU 202. The service accept message may include additional information indicating permanent transfer of PDU C to the 3GPP AT.

In step 7, the WTRU 202 may use the information received in the service accept message to update the SM context to reflect the PDU C being transferred to the 3GPP AT.

The WTRU 202 may determine to not transfer any PDU sessions regardless of whether there is pending DL data or not. The WTRU 202 may have preferences to temporarily reject a PDU session transfer. In this case, based on WTRU policies, the WTRU 202 send a notification response message to the network and indicate that the WTRU 202 temporarily rejects the transfer of the PDU session. The WTRU 202 may include a new cause code for each PDU session, referenced by a PDU ID, indicating that the WTRU 202 does not want to transfer to another AT. Alternatively, the WTRU 202 may have a policy to not transfer the PDU to another AT. In this case, the WTRU 202 may include a cause code indicating so. The WTRU 202 may also send the service request message instead of the notification response message. The WTRU 202 may also indicate a time window during which future requests for PDU transfer across ATs are permitted or are not permitted.

The AMF 208 may receive a NAS message (e.g., a notification response message or a service request message) with information indicating that some PDU sessions, referenced by PDU IDs, may not be transferred to another AT. The cause code or information in the NAS message may indicate a temporary rejection or permanent rejection. The AMF 208 may send a notification message to the SMF 210 to indicate if this is a permanent or temporary rejection. The AMF 208 may include a time at which the SMF 210 may request such a transfer or not. The SMF 210 may update its local information accordingly.

Figure 3:
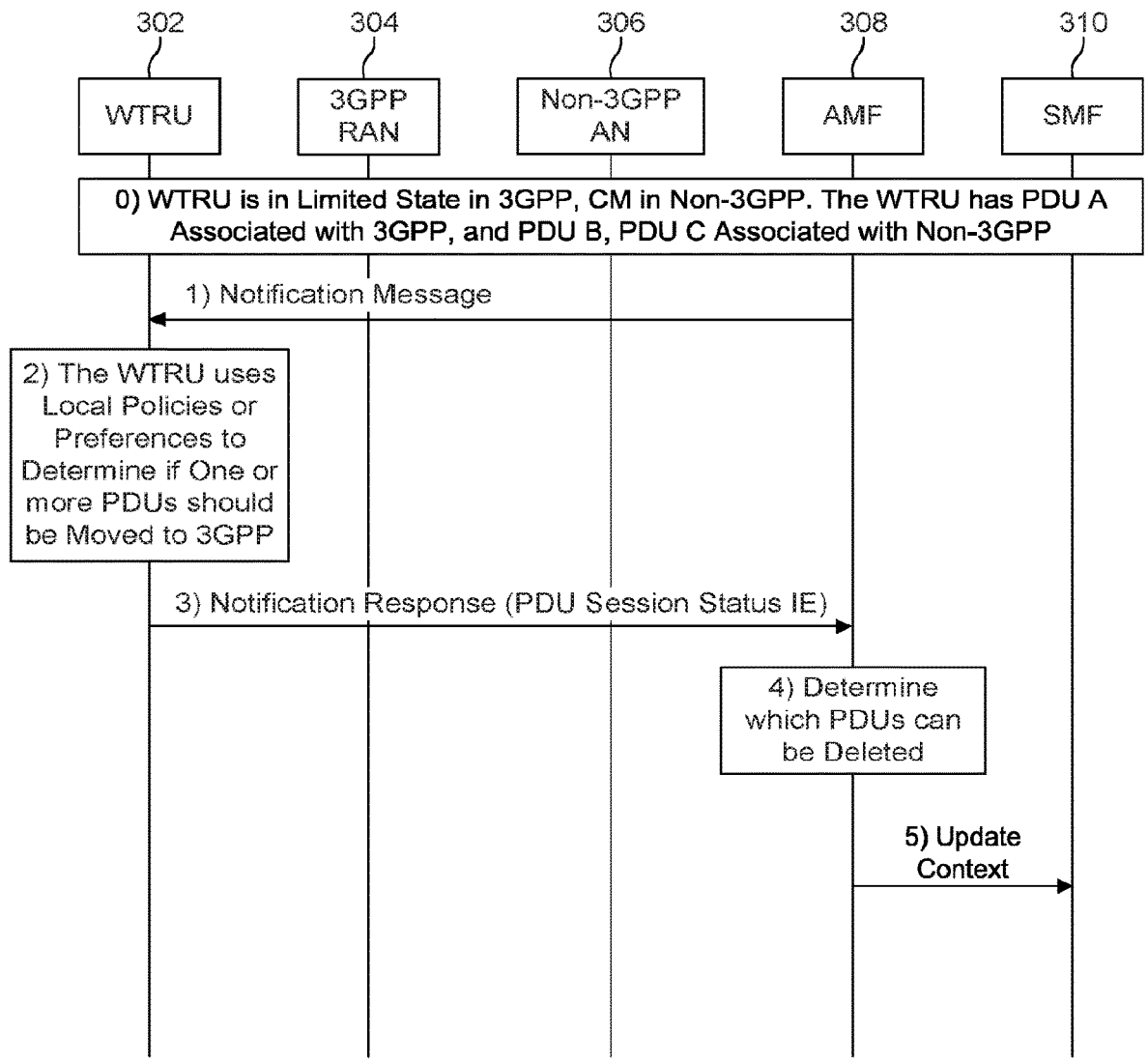
FIG. 3 is a flow diagram illustrating a procedure for PDU management over different ATs is shown.

Referring now to FIG. 3, a flow diagram illustrating a procedure for PDU management over different ATs is shown. The procedure for PDU transfer may include a WTRU 302, a 3GPP RAN 304, a non-3GPP AN 306, an AMF 308, and an SMF 310.

As shown in step 0, the WTRU 302 may be a limited state in the 3GPP AT and in CM in the non-3GPP AT. The WTRU

302 may have a PDU A associated with the 3GPP AT and may have a PDU B and PDU C associated with the non-3GPP AT.

In step 1, the WTRU 302 may receive a notification message from the AMF 308. The notification message may include an indication for the WTRU to reestablish resources for one or more protocol data unit (PDU) sessions. In an example, the resources may be reestablished over a second access technology. In an example, the AMF 308 may start a timer. In step 2, the WTRU 302 may use local policies or preferences to determine if other PDUs should be moved over to the 3GPP AT.

In step 3, the WTRU 302 may send a notification response message to the AMF 308. The notification response message may include a PDU session status IE. The notification response message may be a NAS message. Upon receipt of the notification response message, the AMF 308 may stop the timer.

In step 4, the AMF 308 may determine which PDUs may be deleted.

In step 5, the AMF 308 may send an updated context to the SMF 310.

If the WTRU 302 is in CM for the 3GPP AT and in IM for the non-3GPP AT, or in CM for the non-3GPP AT and in IM for the 3GPP AT, the WTRU 302 may have several PDU sessions. The WTRU 302 may have locally deactivated some PDU sessions without signaling with the network. If the WTRU 302 receives a notification message with a list of PDUs that the network has pending DL data for, or the network wants to transfer to another AT, the WTRU 302 may verify if the PDU sessions, referenced by the PDU IDs, are still active. If not, the WTRU 302 may send a notification response message and include a PDU session status IE to indicate that some PDU sessions have been deactivated by the WTRU 302. Alternatively, the WTRU 302 may send the service request message instead of the notification response message and indicate that the PDU sessions have been locally deactivated. The AMF 308 may then initiate the deactivation of the corresponding PDU sessions towards the SMF 310.

Accordingly, the WTRU 302 may send a notification response message and indicate that PDU sessions have been deactivated. Alternatively, if the WTRU 302 receives a paging request over the 3GPP AT with an access type indicating non-3GPP access, and the WTRU 302 has deactivated its PDU sessions that were associated with the non-3GPP AT, the WTRU 3023 may send a service request message and indicate that there are no PDU sessions active in the WTRU 302 that are associated with the non-3GPP AT. A new IE may be used to indicate this, or the PDU session status IE may be used.

The notification message may be extended to use beyond a PDU session transfer, which may be describe in additional detail herein. The use of the notification message may be extended to make the overall system more efficient. For example, if the WTRU is in CM over the non-3GPP AT and in IM over the 3GPP AT, the AMF may have policies to deliver Short Message Service (SMS) over the 3GPP AT. In order to avoid paging, and the signaling in the system due to the paging, the AMF may send a notification message to the WTRU over the non-3GPP AT to indicate the need to establish the NAS connection over 3GPP even though the reason is not for user plane data. The AMF may include an indication in the notification message to inform the WTRU whether the message is been sent for particular services that are not necessarily related to user plane data. User plane data may refer to any type of data that does not go over the control plane and may be IP or non-IP.

In another scenario, the WTRU may be in a non-allowed tracking area (i.e., it is camped on a cell whose tracking area identity is determined to be a non-allowed tracking area identity) and the WTRU may be in the state "5GMM-REGISTERED.NON-ALLOWED-SERVICE." In this state, the WTRU may not perform the mobility and periodic registration update procedure with an uplink data status IE except for emergency services. Furthermore, the WTRU may not be allowed to initiate the service request procedure.

However, if the WTRU is in CM over the non-3GPP AT and receives a notification message, the WTRU may send a notification response to indicate to the network that it cannot re-activate its user plane resources over the 3GPP AT. The WTRU may also indicate a reason for why this is not possible (i.e., the WTRU may inform the network why it cannot send the service request message). The WTRU may send an IE that can be defined and included in the NAS message (e.g., the notification response) that the WTRU is in a non-allowed area. Other cause codes or IEs may also be defined to reflect existing reasons (e.g., the WTRU is in a limited state or the WTRU is searching for PLMN) or new reasons why this may not be possible for the WTRU to reactive its user plane resources over the 3GPP AT.

As such, if the WTRU is in CM over the non-3GPP AT and in IM over the 3GPP AT and the WTRU's 3GPP state is "5GMM-REGISTERED.NON-ALLOWED-SERVICE," the WTRU may send a notification response message (or any NAS reject message that may be defined) if the WTRU receives a notification with a list of PDU IDs related to 3GPP access or a notification with any other indication (e.g., for network triggered signaling or SMS) that the WTRU should set up its NAS connection over the 3GPP AT.

The methods and procedures described below may be used to handle race conditions for NAS procedures over the 3GPP AT and the non-3GPP AT. A WTRU may be in CM over the non-3GPP AT and in IM over the 3GPP AT. The WTRU may run a periodic registration timer to guard periodic registration updates over the 3GPP AT. The periodic registration may not be supported over the non-3GPP AT. In one scenario, the WTRU may receive a notification message for pending DL data corresponding to PDU sessions, identified by PDU IDs, that are associated with the 3GPP AT. The WTRU may receive this notification message a few seconds or milliseconds away before performing a registration update (i.e., its periodic registration timer may be very close to expiring). By the time the notification message is received, the WTRU may also have to perform a periodic registration as described above. In this case, the WTRU may be faced with a race condition. For example, the notification message may trigger a service request and at the same time the periodic registration timer of the WTRU may have expired.

The WTRU may prioritize the registration update procedure instead of the service request. Upon receipt of a notification message (over the non-3GPP AT) with a list of PDU IDs associated with the 3GPP AT, the WTRU may verify if the PDU sessions are still active in the WTRU. If the PDU sessions are active, the WTRU may send the registration update message over the 3GPP AT and include the uplink data status IE. The WTRU may set the values of the uplink data status IE to include at least the PDU IDs that were present in the notification message. The WTRU may also include other PDU IDs in the uplink data status IE if it has uplink data to send.

Another scenario for race conditions may arises if the WTRU is in IM over the 3GPP AT and in IM over the non-3GPP AT. The WTRU may receive a paging message with the AT type set to non-3GPP, which may indicate that the paging message is triggered by pending DL data for PDU sessions associated with the non-3GPP AT. As described above, the WTRU's periodic registration timer may be about to expire or may have just expired when the WTRU receives the paging message. In this case, the WTRU may also prioritize performing a registration update over the service request. Moreover, the WTRU may include the allowed PDU session status IE in the registration message.

These procedures may also be performed when the WTRU is in the state "ATTEMPTING-REGISTRATION-UPDATE" and the WTRU receives a paging message. In this case, the WTRU may send the registration request message and may include the allowed PDU session status IE in the periodic registration message if the WTRU receives a paging message with the AT type set to non-3GPP.

The procedures also apply for any other triggers or conditions that would require a registration request to be sent by the WTRU and are not limited to the case of the periodic registration. For example, the WTRU may perform a registration update to other parameters related to other features such as, but not limited to, MICO operation and the use of network slicing. Another example of a trigger may be the WTRU entering a new tracking area list, needing to perform a registration update, and receiving a notification message over the non-3GPP AT.

When the AMF sends a paging message, it may start a timer to guard the time during which a response (i.e., a service request) is expected from the WTRU. In the example described above, the reception of the registration request message from the WTRU may cause the AMF to stop the timer. Alternatively, reception of the service request message with the allowed PDU session IE may cause the AMF to stop the timer. If there is no allowed PDU session IE in the registration update message, the AMF may check if a PDU status IE is included. If the PDU status IE includes PDU IDs corresponding to the non-3GPP AT for which the AMF triggered the paging (e.g., due to pending DL data associated with the PDU IDs), the AMF may use this as the trigger to stop the timer. The AMF may consider the paging procedure as successful.

Similarly, when the AMF sends a notification message and starts a timer to guard the response from the WTRU, the AMF may use a received registration request message, as described above, to stop the timer. The AMF may consider the notification procedure as successful.

In cases where the WTRU sends the registration request message, as described above, the AMF may perform one or more of the following actions. The AMF may take all the actions for reception of the service request message or notification response message (if applicable) as described above. For example, the AMF may verify if the included allowed PDU status IE contains PDU IDs that do not have pending DL data but the WTRU wants to transfer to the 3GPP AT. The AMF may determine if the transfer is allowed based on WTRU subscription and/or local policies. If the transfer is accepted, the AMF may inform the SMF (associated with each PDU ID) that the AT has changed to the 3GPP AT. The SMF may update the context for the WTRU to reflect that the AT associated with the PDU is now 3GPP.

The AMF may also include one or more of the IEs described above in the registration accept message. For example, the registration accept message may include information to inform the WTRU if other PDU sessions referenced by a PDU ID are considered to be permanently associated with the 3GPP AT even if no resources are set up for these PDUs. The WTRU may use the included information in the registration accept message in the same manner proposed for the reception of the information in the service accept message or the service reject message as described above. For example, the WTRU may receive a registration accept message with information that at least one PDU is now associated with the 3GPP AT. The WTRU may use this information to update its session management context such that the indicated PDU sessions are now associated with the 3GPP AT.

It should be noted that these procedures may be applied in any combination over any AT. The specific AT are used as examples only and are not intended to limit the procedure to the specific AT mentioned. The AT may be switched for the procedures described above.

Figure 4A:
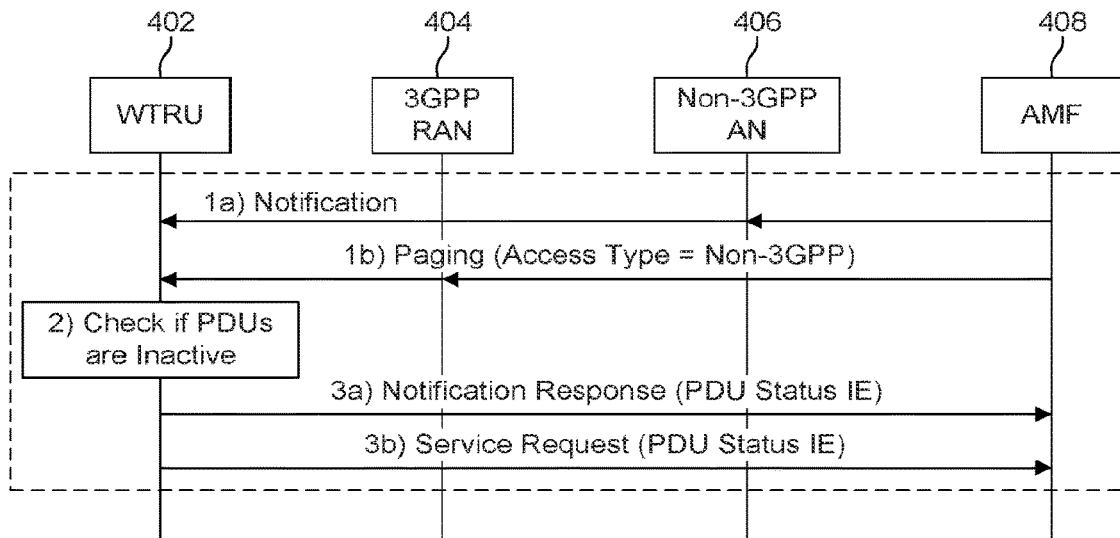
FIG. 4A is a flow diagram illustrating a first example of signaling for handling race conditions.
Figure 4B:
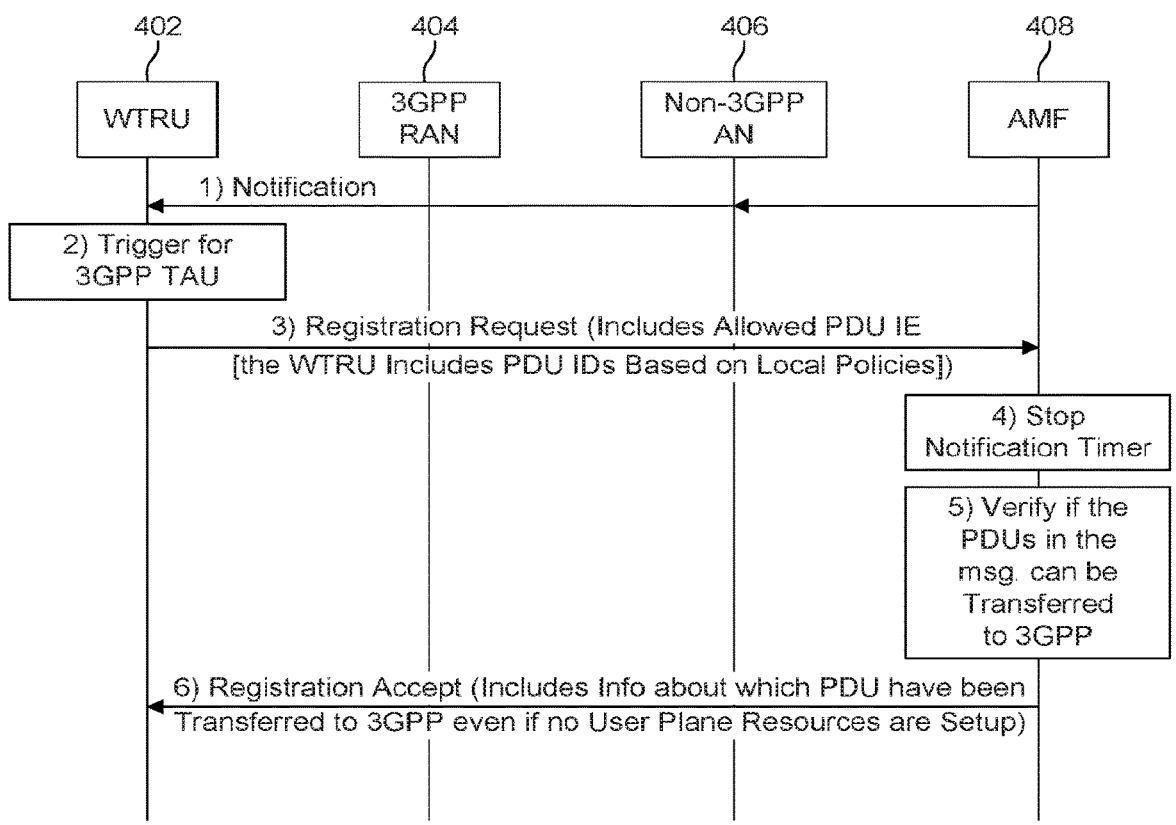
FIG. 4B is a flow diagram illustrating a second example of signaling for handling race conditions.
Figure 4C:
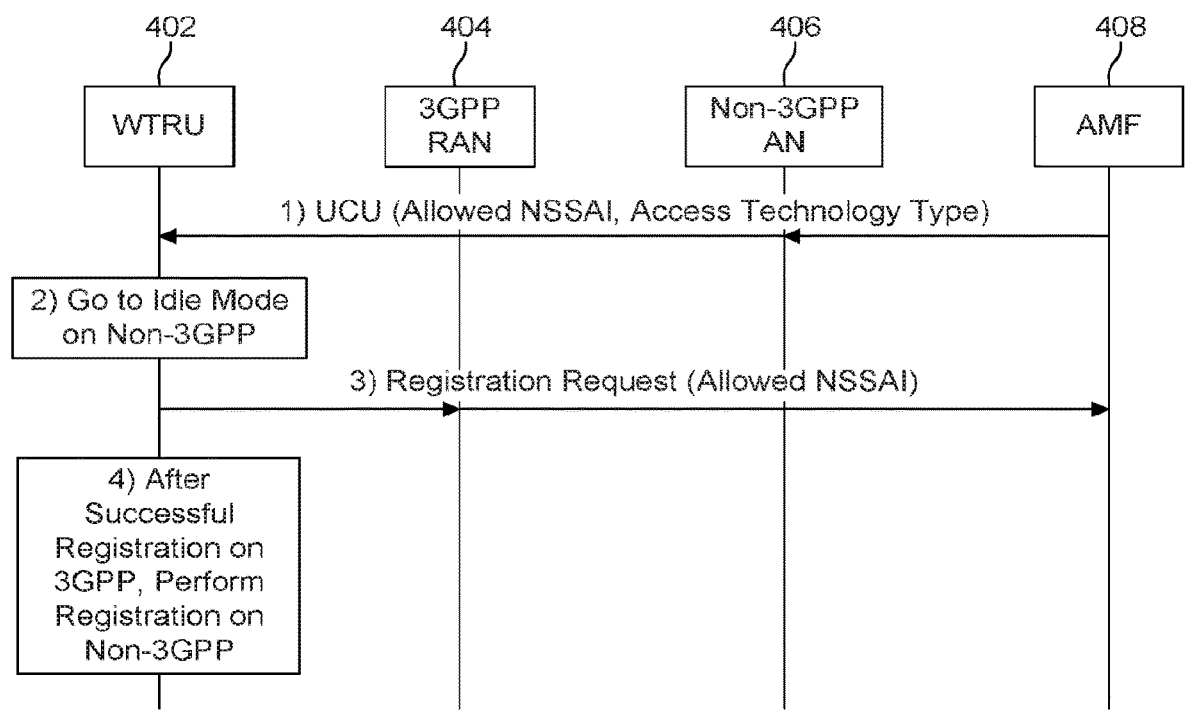
FIG. 4C is a flow diagram illustrating a third example of signaling for handling race conditions.

Referring now to FIGS. 4A-4C, flow diagrams illustrating signaling for handling race conditions is shown. FIG. 4A shows a first example of signaling used in the procedures described above. FIG. 4B shows a second example of signaling used in the procedures described above. FIG. 4C shows a third example of signaling used in the procedures described above. The signaling procedure may include may include a WTRU 402, a 3GPP RAN 404, a non-3GPP AN 406, and an AMF 408.

As shown in FIG. 4A, in step 1a, the AMF 408 may send a notification to the WTRU 402. In an example, the notification may include a list of PDU IDs for the 3GPP AT through the non-3GPP AT. Additionally or alternatively, in step 1b the AMF may send a paging with an access type of non 3GPP through the 3GPP AT. In step 2, the WTRU 402 may check if one or more PDUs are active. In step 3a, the WTRU 402 may send a notification response to the AMF 408 with a PDU status IE. Additionally or alternatively, in step 3b the WTRU 402 may send a service request to the AMF 408 with the PDU status IE.

As shown in FIG. 4B, in step 1 the AMF 408 may send a notification to the WTRU 402. In an example, the notification may include a list of PDU IDs for the 3GPP AT through the non-3GPP AT. In step 2, the WTRU 402 may trigger a TAU. In step 3, the WTRU 402 may send a registration request to the AMF 408. The registration request may include an allowed PDU IE. The WTRU 402 may include PDU IDs based on local policies. In step 4, the AMF 408 may stop a notification timer. In step 5, the AMF 408 may verify if the PDUs in the registration request can be transferred to the 3GPP AT. In step 6, the AMF 408 may send a registration accept message to the WTRU 402. The registration accept message may include information about which PDUs have been transferred to the 3GPP AT even if no user plane resources are set up.

In FIG. 4C, in step 1 the AMF 408 may send a UCU message to the WTRU 402 through the non-3GPP AT. The UCU message may include one or more allowed NSSAI and AT type. In step 2, the WTRU 402 may go to IM in the non-3GPP AT. In step 3, the WTRU may send a registration request message to the AMF through the 3GPP AT. In step 4, the WTRU 402 may perform registration on the non-3GPP AT.

The following procedures may address congestion at the WTRU. Upon reception of an indication from the SMF that congestion related to a specific DNN has been lifted, the AMF may send a notification message to the WTRU over the non-3GPP AT. The notification message may carry an indicator (e.g., an IE) that points to the previously congested network. The notification message may include an explicit indicator that the congestion is terminated, or it may include PDU IDs and additional information such as, but not limited to, DNN and/or S-NSSAI.

The WTRU may receive a notification message that contains at least a list of PDU IDs, and optionally DNN and/or S-NSSAI. The notification message may also include an explicit indication about the termination of congestion per PDU ID. Upon reception of this message, the WTRU may verify if it has any back-off timers running per PDU ID, DNN, S-NSSAI, or any combination. If the WTRU has a corresponding session management back-off timer running for at least any of the PDU IDs in the notification message, the WTRU may stop the corresponding back-off timer and consider that the session management towards at least the SMF, the DNN, the S-NSSAI, or a combination thereof is over. The WTRU may then initiate session management signaling towards the SMF (identified by the PDU ID, DNN, S-NSSAI, or a combination thereof).

The notification message may also be used by the AMF to inform the WTRU of a start of congestion control for either mobility management or session management. When it determines that the AMF or SMF is congested, the AMF may send the notification message and indicate that congestion control should be applied by the WTRU for mobility management and/or session management signaling. The AMF may include a corresponding mobility management back-off timer and/or session management timer. The latter may be related to SMF congestion, DNN congestion, S-NSSAI congestion, or a combination thereof. Upon reception of the notification message, the WTRU may start the corresponding back-off timer (i.e., mobility management and/or session management) and may refrain from sending messages to the AMF and/or SMF accordingly.

The procedures described above to indicate to the WTRU that congestion is over for session management level may also be used for the mobility management level. For example, the notification message may be sent to the WTRU over the non-3GPP AT with an explicit indication that congestion control at the mobility management layer is terminated. The WTRU may use this as an indication to stop the mobility management back-off timer.

If congestion is severe, the CN may inform the RAN to back-off devices upon their request for an RRC connection. The RAN node (e.g., gNB) may reject RRC connection request messages from WTRUs and may provide them with a so called extended wait time (EXT). The EXT may act as a back-off timer. If the WTRU receives the EXT from the RAN node, it may directly apply the MICO mode, as described above, and only attempt to transition from IM to CM mode once the timer expires.

As described above, a new field may be used for the EPD. Table 1 shows legacy values for the PD, which may be currently used.

TABLE 1

Protocol Discriminator Values

Bits 4321 Indication

| 0 0 0 0 | group call control |
| 0 0 0 1 | broadcast call control |
| 0 0 1 0 | EPS session management messages |
| 0 0 1 1 | call control; call related SS messages |
| 0 1 0 0 | GPRS Transparent Transport Protocol (GTTP) |
| 0 1 0 1 | mobility management messages |
| 0 1 1 0 | radio resources management messages |
| 0 1 1 1 | EPS mobility management messages |

TABLE 1-continued

Protocol Discriminator Values

Bits 4321 Indication

| 1 0 0 0 | GPRS mobility management messages |
| 1 0 0 1 | SMS messages |
| 1 0 1 0 | GPRS session management messages |
| 1 0 1 1 | non call related SS messages |
| 1 1 0 0 | Location services specified in 3GPP TS 44.071 |
| 1 1 1 0 | reserved for extension of the PD to one octet length |
| 1 1 1 1 | used by tests procedures described in 3GPP TS 44.014, 3GPP TS 34.109 and 3GPP TS 36.509 |

The code-point "1110" may be reserved for the extension of the PD field to one octet. This means that a receiver, upon reading "1110", understands that the actual value of the PD (or EPD in this case) may be realized in the whole octet.

Conventional 5G systems may have two NAS protocol entities, the 5GMM and the 5GSM. Only two code-points may need to be allocated for these two protocol entities. However, there are a total of 16 available values/code-points that may need to be defined.

The value "zero" may not be used and may instead refer to an error or abnormal situation. The reason behind this proposal is that certain L3 NAS messages have historically had a "Skip Indicator" that was all zeroes and resided in the left half octet of the first octet. Examples of such protocols would be MM, GMM, EMM.

Two distinct values may be assigned to the existing 5G NAS protocols (i.e., 5GMM and 5GSM). For example, a value of "0001 1110" may be used for 5GMM and a value of "0010 1110" may be used for 5GSM. The actual EPD value for 5GMM may be "30" and the actual value for 5GSM may be "46." It should be noted that other values may be used to refer to 5GMM or 5GSM protocols. For example, if bits 8 to 5 have a value of "1110," the WTRU and/or the AMF may consider the EPD to be further extended by at least one additional octet. The WTRU and/or AMF may then process the additional octet to determine the protocol. The additional octet may introduce 256 new values. The values may start at "0" (i.e., all bits are zero), or the values may start with 256 plus the value of the previous octet having bit positions as follows: "11101110" (decimal value of 238). The new octet may have new reserved values that may be defined as needed.

Figure 5:
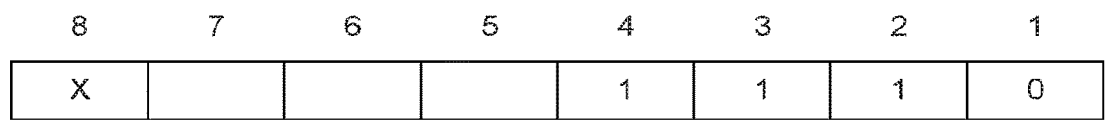
FIG. 5 is a diagram illustrating an Extended Protocol Discriminator (EPD)

Referring now to FIG. 5, a diagram illustrating an EPD is shown. A code-point may be reserved for future use. For example, the code-point may be used to point out the usage of another mechanism or even another protocol. This may be done by either using a value in the entire EPD octet or by using only one or more bits. For the latter case, the most significant bit of the octet (i.e. bit number 8, shown as "X" in the FIG. 5) may serve this purpose. If this bit is a zero, the EPD may refer to 5G NAS protocol entities. However, if the bit value changes to a "1," a different protocol may be used and the interpretation of the following octets may be different.

Additional information may be provided in the WTRU configuration update message to ensure correct WTRU behavior. As described above, the WTRU configuration update message may lack certain information such that, upon reception, the WTRU behavior may not be as expected or may not be complete. In order to remove ambiguity at the WTRU side so that a correct procedure is run over the correct AT, WTRU may treat the WTRU configuration update message as described below.

In an example, the network may send the WTRU configuration update message over different ATs to update parameters that are specific to that AT. If the WTRU is registered over the 3GPP AT and the network wants to provide updated parameters to the WTRU related to features that are only available on the 3GPP AT (e.g., MICO, LADN, new service area, NSSAI), the AMF may send the WTRU configuration update over the 3GPP AT. As such, the WTRU may respond over that same AT. If the WTRU is in CM over the 3GPP AT, the AMF may send the WTRU configuration update message to the WTRU. However, if the WTRU is in IM over the 3GPP AT, the AMF may first page the WTRU and then execute the WTRU configuration update procedure towards the WTRU.

Alternatively, if the WTRU is also registered over the non-3GPP AT and the WTRU is in CM over the non-3GPP AT but in IM over the 3GPP AT, the AMF may first send a notification message over the non-3GPP AT and indicate to the WTRU to establish its NAS connection over the 3GPP AT for the purpose of signaling. The notification message may contain new IE to indicate to the WTRU that it has to establish its NAS connection over the 3GPP AT. Alternatively, the indication from the AMF in the WTRU configuration update message may explicitly inform the WTRU (e.g., via new IEs) that the NAS connection has to be established with a service request or a registration request message.

If the WTRU is in CM over the non-3GPP AT and WTRU configuration update message over the non-3GPP AT with new parameters (e.g., GUTI, TAI, and/or NSSAI), the WTRU may consider the parameters to only affect the non-3GPP AT. As such, the WTRU may update its non-3GPP parameters with the parameters received over the non-3GPP AT. For example, if the WTRU receives a new TAI, it may consider a previous TAI received over the non-3GPP AT as invalid and use the new received TAI as the most up to date and valid TAI. The WTRU may also update its 5G GUTI with the new value. However, if the WTRU is also registered to the same AMF within the same PLMN, the WTRU may also consider the new 5G GUTI to be valid for both ATs.

Another way to ensure that the WTRU knows which parameters to use per AT, may be to send the WTRU configuration update message on either AT and include additional information to tell the WTRU to which AT the received parameters apply.

If the WTRU receives a WTRU configuration update message over a particular AT, and the WTRU configuration update message contains parameters for the same or different AT over which the message was received, the WTRU may first send a configuration update complete message over the same AT over which the WTRU configuration update message was received. Alternatively, the WTRU may have policies to use a different AT to send the configuration update complete message.

The WTRU may receive a WTRU configuration update message over the non-3GPP AT that indicates that new MICO parameters need to be negotiated or that the WTRU configuration update message was sent due to a MICO parameter update. A registration required indication may be provided in the message. If the WTRU is in IM over the 3GPP AT, the WTRU may remain in CM over the non-3GPP AT but may initiate a registration procedure (i.e., send a registration request message) to the network in order to negotiate new MICO parameters.

If the AMF wants to send a new 5G GUTI and TAI list to the WTRU, the AMF may inform the WTRU if the TAI is applicable to the 3GPP AT or the non-3GPP AT. This information may be included regardless of the AT over which the WTRU configuration update message is sent. The AMF may also send a different AT indication per TAI, or the TAI may be sent per AT. The TAI field may be defined such that it has an associated AT type. The indication of TAI association to an AT type may be important since the AMF may want to change the parameters related to one AT but not the other. Similarly, the AMF may inform the WTRU about each parameter's association to an AT whenever applicable. For example, for every list of NSSAI, the AMF may inform the WTRU whether the new NSSAI provided in a WTRU configuration update is applicable to one AT or both.

When the WTRU receives a WTRU configuration update message with a new 5G GUTI and/or TAI, the WTRU may verify what type of AT the TAI list applies to or affects. The WTRU may update the TAI list of the indicated AT accordingly. The WTRU may receive more than one TAI list and AT type IE. The WTRU may use the provided TAI list, per AT, to represent the valid TAI list for the WTRU per AT such that the previous TAI list per AT may be considered invalid by the WTRU.

When the WTRU receives a new allowed NSSAI, the WTRU may verify the AT that is associated with the new NSSAI. The WTRU may update its list of allowed NSSAI associated with the indicated AT accordingly.

The WTRU configuration update message may contain a new allowed NSSAI and may also indicate a need for registration by the WTRU. If the WTRU receives a new NSSAI over the non-3GPP AT, the WTRU may verify if the message contains a new list of allowed NSSAI. If the message does contain a new list of allowed NSSAI, the WTRU may verify the AT associated to the new list and may update the list accordingly. Moreover, if the WTRU configuration update indicates that a registration is required, then the WTRU may perform a registration on the indicated AT without transitioning to IM on the non-3GPP AT. The WTRU may remain in CM over the non-3GPP AT.

If the WTRU configuration update message contains a new allowed NSSAI and a registration required indication, but does not include an AT type, the WTRU may perform one or more of the following actions. The WTRU may consider the 5G GUTI as invalid for both ATs. The WTRU may locally deactivate all its PDU connections that are associated with both the 3GPP AT and the non-3GPP AT. The WTRU may send a registration request over the 3GPP AT and may provide its SUPI and the new allowed NSSAI to the lower layer.

After successful registration on the 3GPP AT, the WTRU may re-register over the non-3GPP AT and may use the 5G GUTI that was obtained over the 3GPP AT. The WTRU may have policies to register over the non-3GPP AT first and then register with the 3GPP AT later. For example, the WTRU may first register over the AT over which the WTRU configuration update message was received.

The WTRU may establish its PDU sessions over each of the ATs as needed. The PDU sessions may be established based on the allowed NSSAI and WTRU policy.

The AMF may have policies to use a particular AT type for Short SMS signaling. For example, the AMF may prefer use the 3GPP AT for SMS based on a local policy. This policy may change over time and may not be static. The AMF may determine the preferred AT to use for SMS based on one or more of local policies, subscription information, and subscription information updates from the Unified Data Management (UDM) function. The AMF may inform the WTRU about the new AT that should be used. For a WTRU that is already registered, the AMF may first page the WTRU if the WTRU is in idle mode. The AMF may use the WTRU configuration update message to indicate the preferred AT to use for SMS. The WTRU configuration update may contain one or more IEs indicating the affected service (e.g. SMS or location service) and the AT to use. Alternatively, if the WTRU is already in CN, either over the 3GPP AT or the non-3GPP AT, the AMF may send the WTRU configuration update message with the proposed information, which may include the affected service (e.g. SMS) and the preferred AT to use for the service.

The WTRU may receive a WTRU configuration update message with updated parameters and information. The WTRU may verify only the indicated or affected services and the associated preferred access technology.

The AMF may use the WTRU configuration update command procedure to update the slice coexistence parameters at the WTRU. When the slice coexistence information changes at the network side (e.g., due to network configuration), the AMF may be notified by one of the network functions, such as a Network Slice Selection Function (NSSF), a Unified Data Management (UDM) function, and a Policy Control Function (PCF), or an operations and maintenance (O&M) system. The AMF may then send the new slice coexistence information to the WTRU in the WTRU configuration command message.

The AMF may send the WTRU configuration update message over both AT if the WTRU is connected simultaneously to 3GPP AT and non-3GPP AT. The coexistence information may affect the NSSAIs that are configured or allowed in both the 3GPP AT and the non-3GPP AT. The AMF may send this information on the AT having NSSAIs that are effected by change in slice coexistence information. Alternatively, the AMF may send the WTRU configuration update message on either the 3GPP AT or the non-3GPP AT, and may include an AT value to which the new slice coexistence information pertains to.

The slice coexistence information sent by the AMF may include one or more single NSSAIs (S-NSSAIs) that belong to isolated slices or one or more S-NSSAIs that cannot be included with the requested NSSAI.

A WTRU may perform one or more of the following actions upon receiving a WTRU configuration update message with updated slice coexistence information. The WTRU may compare the received slice coexistence information with existing coexistence information to determine if the allowed NSSAI is still valid. If the allowed NSSAI is no longer valid (e.g., because it contains an NSSAI that is now marked as isolated in the new slice coexistence information), then the WTRU may perform a registration update procedure (e.g., a mobility type registration update). The WTRU may delete the existing slice coexistence information and replace it with the new slice coexistence information. When the WTRU performs the re-registration procedure, the WTRU may take into the account the received coexistence information to determine the requested NSSAI. The requested NSSAI may be included in the registration request message to the AMF. The WTRU may not include a received isolated S-NSSAI in the requested NSSAI.

With the introduction of an IP Multimedia Subsystem (IMS), SMS message may be sent over IP networks. The SMS messages may be exchanged in the User Plane and the routing may be done by means of IP-packets. This version of SMS may be referred to as "SMS over IP" or "SMS over IMS." In order to support SMS over IP/IMS, the network operator may need to enhance their infrastructure by means of a specific gateway, called an IP-SM-GW.

With the introduction of 5G networks, the operator may have more freedom for the choice of the network. This means that, during the registration phase, the WTRU and the network may negotiate about how the SMS is supported and realized. As an example, the network may inform the WTRU that the legacy SMS over NAS shall not be used, which means that the only option of sending/receiving SMS for the WTRU would be SMS over IP/IMS.

When it comes to the actual transfer of SMS over NAS, the corresponding signaling protocols may be in the WTRU and the SMS Function (SMSF) on the core network side. At the NAS level, SMS messages and their corresponding acknowledgements may be exchanged between the WTRU and SMSF.

In 5G systems, Cellular Internet of Things (CIoT) small data may be delivered via NAS signaling using similar behaviors as with SMS over NAS. During the registration phase, the WTRU and the network may negotiate about how the small data over NAS is supported and realized. If the small data over NAS is enabled, the WTRU may send/receive small data in the NAS signaling to/from the AMF.

At any time, based on an operator's operations and maintenance (O&M) as well as network configuration, a user's subscription may change. If this occurs, the home data base, Unified Data Management (UDM), may inform and update the anchor node for mobility where the WTRU is registered. In a 5G system (5GS), this anchor node may be the AMF. It should be noted that the only way for a WTRU to be notified about any possible change may be to perform a registration update procedure toward the AMF.

In 5GS, the AMF node may only be responsible for mobility management signaling. Service related signaling messages may either be exchanged between the WTRU and SMF (for establishing so called PDU Sessions), between the WTRU and SMSF (for the SMS over NAS traffic), or other nodes. The AMF may act as a relay when it comes to service related signaling traffic by means of sending and receiving message to/from the WTRU and SMF/SMSF.

Two special NAS messages may be used (e.g., at the Mobility Management level) between the WTRU and the AMF. These messages may be called uplink/downlink (UL/DL) NAS Transport messages and may contain a container, which may be either a 5GSM message (for WTRU-SMF communication) or an SMS message (for WTRU-SMSF communication). In either direction, the AMF may extract the container and forward it to the correct (SMF or SMSF) node. An information element (IE) may be defined in the message that points out the type of container. This IE may be called the Payload Container Type. The IE may also point out other nodes in the network.

The WTRU may be unaware of whether (or when) subscription changes on the network side occur. The only way of having both the WTRU and the AMF synchronized about the changes in subscription may be to have the WTRU go through a registration update procedure. While the WTRU is normally supposed to do a periodic registration (e.g., according to expiration of a timer), it may take a very long time before it actually does that. The timer may be reset, both on the WTRU and on the NW side, each time the WTRU transitions from Idle to Connected Mode at the NAS level.

These issues may also exist in CIoT small data delivery (i.e., small data over NAS signaling). For example, the WTRU subscription on the CIoT feature may also change to "not allowed" for small data over NAS. In this case, the WTRU may also be unaware of the subscription change on the network side.

Considering the issues above, a mechanism may be needed for the network/AMF to inform the WTRU about the changes in subscription.

Figure 6:
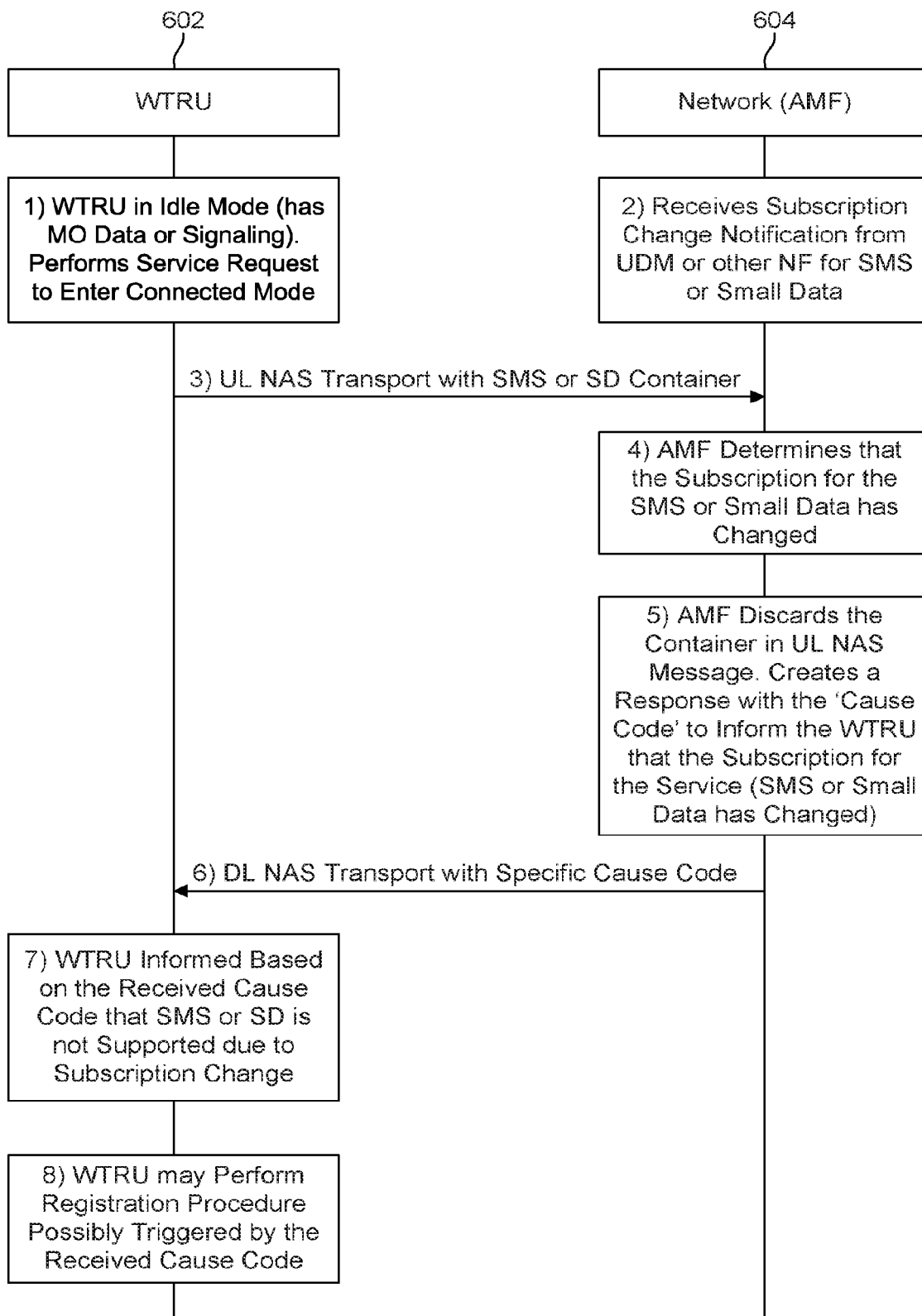
FIG. 6 is a diagram illustrating using a method of updating subscription type.

Referring now to FIG. 6, a diagram illustrating using a method of updating subscription type is shown. In step 1, when a WTRU 602 wants to send an SMS or small data over NAS in Idle Mode, it may start the signaling traffic by a Service Request procedure, hence transitioning to the Connected Mode. The Service Request procedure may include sending a Service Request message to the network. In step 2, an AMF 604 may receive a subscription change notification from a UDM or other NF for SMS or small data.

In step 3, the WTRU 602 may send a first portion of the SMS message or small data in an UL NAS Transport message. It may be possible that the SMS or small data is sent by the WTRU in the Service Request message.

In step 4, the AMF 604 may determine that the subscription for SMS or small data has changed, and therefore the AMF may not forward the container to the SMSF (for SMS) or Network Exposure Function (NEF)/SMF (for small data).

In step 5, the AMF 604 may extract and discard the container containing the SMS or small data.

In step 6, AMF 604 may send a DL NAS Transport message or DL NAS error message, including a dummy container (i.e., with no meaning) and a certain cause code. A new payload container type may be defined to point out that this particular container is a dummy. In step 7, the cause code may trigger a new behavior at the WTRU 602.

In step 8, the WTRU 602 to start a registration procedure. During the registration procedure, the network (AMF 604) may inform the WTRU 602 that the SMS over NAS or small data over NAS is not allowed anymore. The WTRU may receive such indication in the registration accept message.

It should be noted that the AMF 604 may communicate the subscription change to the WTRU 602 prior to the reception of a Service Request procedure from the WTRU 602 if the AMF 604 needs to contact the WTRU 602 for other reasons (e.g., a UCU procedure triggered due, for instance to a Network Slice modification or deletion). This may prevent the WTRU 602 from requesting SMS small data transmission. The AMF 604 may use the existing registration/no registration indication to cause the WTRU 602 to register.

The SMS or small data may be sent by the WTRU 602 in the Service Request message when the WTRU 602 transitions to Connected Mode. The AMF 604 may perform the procedure described above when it receives the Service Request with small data or SMS container. Upon receiving the Service Request, the AMF 604 may determine that the subscription for the SMS or small data has changed. The AMF 604 may discard the container in an UL NAS message and may create a response with the cause code to inform the WTRU 602 that the subscription for the service (SMS or small data has changed. The AMF 604 may send the cause code in either the Service Accept or the Service Reject NAS message. Upon receiving the cause code, the WTRU 602 may be informed that SMS or SD is not supported due to subscription change. The WTRU 602 may then perform a registration procedure triggered by this cause code.

Alternatively, the AMF 604 may forward the SMS or small data over NAS to the SMSF or NEF/SMF. The AMF 604 may include the response from SMSF or NEF/SMF in the DL NAS Transport message and add the cause code, as described above, to cause the WTRU 602 to perform registration update.

In another example, a WTRU Configuration Update (UCU) Command message may be used. In this example, the WTRU 602 may be in Connected Mode for reasons other than SMS traffic when the subscription change for SMS or small data over NAS occurs.

The AMF 604 may send a UCU Command message to the WTRU 602 on the existing NAS signaling connection to inform the WTRU 602 that there is a change in subscription that requires a re-registration by the WTRU 602. The UCU Command message may include a specific cause code as described above.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising a processor and memory configured to:
  receive a first message from a network via a first access technology, the first message comprising an indication for the WTRU to reestablish resources for a protocol data unit (PDU) session, wherein the PDU session is associated with a second access technology and is locally de-activated at the WTRU; and
  send a second message via the first access technology, the second message comprising a PDU session status information element (IE) indicating the PDU session is locally deactivated.

2. The WTRU of claim 1 further configured to:
  determine that the WTRU is in a limited service state associated with the second access technology.

3. The WTRU of claim 1 further configured to:
  register with the network via both the first access technology and the second access technology.

4. The WTRU of claim 1 wherein the first access technology is a non-Third Generation Partnership Project (non-3GPP) access technology and the second access technology is a 3GPP access technology.

5. The WTRU of claim 1 wherein the first access technology is an IEEE 802.11 access technology and the second access technology is a 3GPP access technology.

6. The WTRU of claim 1 wherein the WTRU is in connected mode (CM) in the first access technology.

7. The WTRU of claim 1 wherein the WTRU is in idle mode (IM) in the second access technology.

8. The WTRU of claim 1 wherein the second message comprises a notification response message..

9. The WTRU of claim 1 wherein the second message is a non-access stratum (NAS) message.

10. A method for use in a wireless transmit/receive unit (WTRU), the method comprising:
  receiving a first message from a network via a first access technology, the first message comprising an indication for the WTRU to reestablish resources for one or more protocol data unit (PDU) sessions over a second access technology, wherein the second access technology is locally deactivated at the WTRU; and sending a second message via the first access technology, the second message comprising a PDU session status information element (IE) indicating the PDU session is locally deactivated.

11. The method of claim 10, further comprising:
determining that the WTRU is in a limited service state associated with the second access technology.

12. The method of claim 10, further comprising:
registering with the network over both the first access technology and the second access technology.

13. The method of claim 10, wherein the first access technology is a non-Third Generation Partnership Project (non-3GPP) access technology and the second access technology is a 3GPP access technology.

14. The method of claim 10, wherein the first access technology is an IEEE 802.11 access technology and the second access technology is a 3GPP access technology.

15. The method of claim 10, wherein the network comprises an Access and Mobility Function (AMF) shared between the first access technology and the second access technology.

16. The method of claim 10, wherein the WTRU is in connected mode (CM) in the first access technology.

17. The method of claim 10, wherein the WTRU is in idle mode (IM) in the second access technology.

18. The method of claim 10, wherein the second message is a non-access stratum (NAS) message.

19. The method of claim 10, wherein the second message comprises a notification response message.

20. The method of claim 10, wherein the PDU session is locally deactivated while the WTRU is in a limited service state of the second access technology.

* * * * *